United States Patent
Tapti (10) Patent No.: US 10,272,846 B2
(45) Date of Patent: Apr. 30, 2019

(54) DEVICE HOLDER ASSEMBLY, DASHBOARD AND VEHICLE COMPRISING THE SAME, AND METHOD OF HOLDING A MOBILE ELECTRONICS DEVICE

(71) Applicants: Hyundai Motor Europe Technical Center GmbH, Russelsheim (DE); Hyundai Motor Company, Seoul (KR); Kia Motors Corporation, Seoul (KR)

(72) Inventor: Firat Tapti, Eppertshausen (DE)

(73) Assignees: Hyundai Motor Europe Technical Center GmbH, Russelsheim (DE); Hyundai Motor Company, Seoul (KR); Kia Motors Corporation, Seoul (KR)

(*) Notice: Subject to any disclaimer, the term of this patent is extended or adjusted under 35 U.S.C. 154(b) by 85 days.

(21) Appl. No.: 15/254,180

(22) Filed: Sep. 1, 2016

(65) Prior Publication Data

US 2017/0297503 A1   Oct. 19, 2017

(30) Foreign Application Priority Data

Apr. 14, 2016   (DE) .................. 10 2016 206 230

(51) Int. Cl.
*B60R 11/00* (2006.01)
*B60R 11/02* (2006.01)

(52) U.S. Cl.
CPC .......... *B60R 11/0241* (2013.01); *B60R 11/02* (2013.01); *B60R 2011/0005* (2013.01); *B60R 2011/0082* (2013.01)

(58) Field of Classification Search
CPC ................ B60R 11/0241; B60R 11/02; B60R 2011/0005; B60R 2011/0082
USPC ......................................................... 224/483
See application file for complete search history.

(56) References Cited

U.S. PATENT DOCUMENTS

| | | | |
|---|---|---|---|
| 7,407,212 B2* | 8/2008 | Kataoka | B60R 7/06 224/483 |
| 2009/0272776 A1* | 11/2009 | Baudisch | B60K 35/00 224/483 |
| 2013/0008932 A1* | 1/2013 | Shindo | B60N 3/102 224/483 |

FOREIGN PATENT DOCUMENTS

| | | |
|---|---|---|
| JP | 2003-229942 A | 8/2003 |
| KR | 2014-0044431 | 4/2014 |
| KR | 2014-0066368 A | 6/2014 |

* cited by examiner

*Primary Examiner* — Peter N Helvey
(74) *Attorney, Agent, or Firm* — Mintz Levin Cohn Ferris Glovsky and Popeo, P.C.; Peter F. Corless (57) ABSTRACT

A device holder assembly includes: a device holder holding a mobile electronics device; a stowage mechanism performing a stowage movement to transition the device holder between a stowed position and a device holding position; and a blocking mechanism which blocks the stowage movement from transitioning the device holder to the device holding position when the mobile electronics device is held by the device holder.

8 Claims, 7 Drawing Sheets

DEVICE HOLDER ASSEMBLY, DASHBOARD AND VEHICLE COMPRISING THE SAME, AND METHOD OF HOLDING A MOBILE ELECTRONICS DEVICE

CROSS-REFERENCE TO RELATED APPLICATION

This application claims under 35 U.S.C. § 119(a) the benefit of German Patent Application No. 102016206230.1 filed Apr. 14, 2016, the entire contents of which are incorporated herein by reference.

TECHNICAL FIELD

The present disclosure relates generally to a device holder assembly for use in a vehicle, and in particular, a device holder assembly for holding a mobile electronics device such as a telephone or smartphone in a vehicle.

BACKGROUND

Increasingly, mobile electronics devices such as telephones, e.g., smartphones, navigation systems, entertainment devices, tablet computers, e-book readers, and the like are being used in vehicles as an alternative to electronics components permanently built into the vehicle. For the user, this has the advantage that is possible to use his or her own electronics device both inside and outside the vehicle, and to easily exchange the electronics device for another, e.g. for a technologically improved model, without requiring complicated retrofitting procedures.

When using mobile electronics devices in a vehicle, different types of device holders that are able to hold the device at a fixed position inside the vehicle are known. In order to prevent theft of an electronics device from a parked vehicle, however, it has been suggested to stow away not only the electronics device when leaving the vehicle but also the device holder in order not to give an indication that the electronics device may still be present inside the vehicle, e.g. in a glove compartment.

For example, a conventional device holder assembly is formed as part of a compartment formed in an automobile dashboard. The compartment has an upward-facing opening. The device holder can be swiveled between an out-of-use position wherein the device holder is contained within the compartment, which is closable by a roller shutter, and a use position wherein the device holder is swiveled out of the compartment. After a user has swiveled the device holder into the use position, the roller shutter is closed partially to mechanically support the device holder from the backside. Before swiveling the device holder back to the out-of-use position, the roller shutter is to be opened again to expose the compartment opening.

However, it is desirable to render the process of changing a device holder between a use position and an out-of-use position where the device holder can be stowed away more conveniently.

SUMMARY

The above shortcoming in the related art is solved by a device holder assembly, by a dashboard, by a vehicle, and by a method of holding a mobile electronics device in a vehicle, as is presently described and claimed herein.

According to embodiments of the present disclosure, a device holder assembly for use in a vehicle includes: a device holder holding a mobile electronics device; a stowage mechanism performing a stowage movement to transition the device holder between a stowed position and a device holding position; and a blocking mechanism which blocks the stowage movement from transitioning the device holder to the device holding position when the mobile electronics device is held by the device holder.

The device holder assembly provides both a device holding position wherein the device holder is enabled to hold a mobile electronics device and a stowed position. If a user wishes to use the device holder to hold a mobile electronics device when the device holder is in the stowed position, it is sufficient to perform two actions, namely the stowage movement of the device holder from the stowed position (i.e., out-of-use position) to the device holding position (I.e., use position) and the action of placing the mobile electronics device in the device holder. Because the blocking mechanism blocks the stowage movement from the device holding position when the mobile electronics device is held by the device holder, it is not necessary for the user to perform a third action such as separately supporting the device holder from behind in order to prevent the device holder from leaving the device holding position during use. Consequently, the user is enabled to conveniently handle device holder assembly even if, for example, there are frequent changes between the stowed position and the device holding position of the device holder.

The stowage mechanism may include a first guide rail to guide movement of the device holder during the stowage movement. This enables the user to perform the stowage movement of the device particularly smoothly and swiftly. Because the device holder is guided by the first rail, the device holder can be conveniently moved along even complex paths during the stowage movement, thus enabling it to be stowed away space-efficiently even in cramped conditions.

The stowage mechanism may further include a stage that is pivotably connected with the device holder and a second guide rail to guide movement of the stage during the stowage movement. This enables to perform even more complex stowage movements such as combinations of translation and rotation smoothly, swiftly and conveniently.

A connection point at which the stage is pivotably connected with the device holder includes an oblong hole. For example, the oblong hole may be formed on the side of the stage, with a pin of, for example, cylindrical shape being formed on the side of the device holder, or vice versa, such that the pin is able to both rotate within the oblong hole and slide along the same. This enables to finely adjust the position device holder when in the device holding position, e.g., by performing an adjustment swivel movement.

The device holder may further include a first holding element that is slidable in a first direction to receive the mobile electronics device. In this way, the device holder is enabled to accommodate mobile electronics devices of different shapes and sizes, in particular different lengths in the first direction.

The device holder assembly may further include an elastic element, e.g., a helical spring, and a blocking element of the blocking mechanism. The elastic element may extend from the first holding element to the blocking element, and the blocking element may be configured to block the stowage movement when pulled in the first direction. By enabling the elastic element to follow a straight path, the blocking mechanism can be activated in a particularly simple and mechanically reliable way.

The blocking mechanism may further include an engagement element, and the blocking element may be further configured to block the stowage movement by engaging the engagement element when pulled in the first direction. This enables a particularly simple realization of the blocking mechanism, e.g., by providing the engagement element simply as a statically fixed element.

The engagement element may be configured to engage a guided element of the device holder to perform an adjustment swivel movement that moves the device holder around the guided element. For example, the engagement element may be provided as a pivoting member that engages the guided element when being engaged by the blocking element. In this way, the adjustment swivel movement is enabled simultaneously with blocking the stowage movement in a mechanically simple way.

Furthermore, according to embodiments of the present disclosure, a dashboard for a vehicle may include the device holder assembly as described above. Similarly, according to embodiments of the present disclosure, a vehicle may include the device holder assembly as described above.

Furthermore, according to embodiments of the present disclosure, a method of holding a mobile electronics device in a device holder in a vehicle includes: performing a stowage movement to transition the device holder between a stowed position and a device holding position; holding a mobile electronics device in the device holder; and activating a blocking mechanism which blocks the stowage movement from transitioning the device holder to the device holding position when the mobile electronics device is held in the device holder.

The method may further include guiding movement of the device holder during the stowage movement using a first guide rail, which enables a particularly smooth movement.

The stowage movement may be blocked by blocking a guided element of the device holder using the first guide rail. The guided element, being already restricted to movement along the rail, can be blocked in a particularly simple way. The guided element of the device holder may be blocked within the first guide rail at an end position thereof. In this case, simply blocking the movement of the guided element in a single direction only suffices to completely and stably immobilize the guided element.

The method may further include performing an adjustment swivel movement that moves the device holder. In this way, for instance, an angular position of a display of the mobile electronics device can be adjusted for best viewing. The adjustment swivel movement may move the device holder around the guided element of the device holder. In this way, the adjustment swivel movement can be enabled simultaneously with blocking the stowage movement in a mechanically simple way by engaging the guided element.

Unless indicated otherwise, like reference numbers throughout the figures indicate like elements. It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Figure 1:
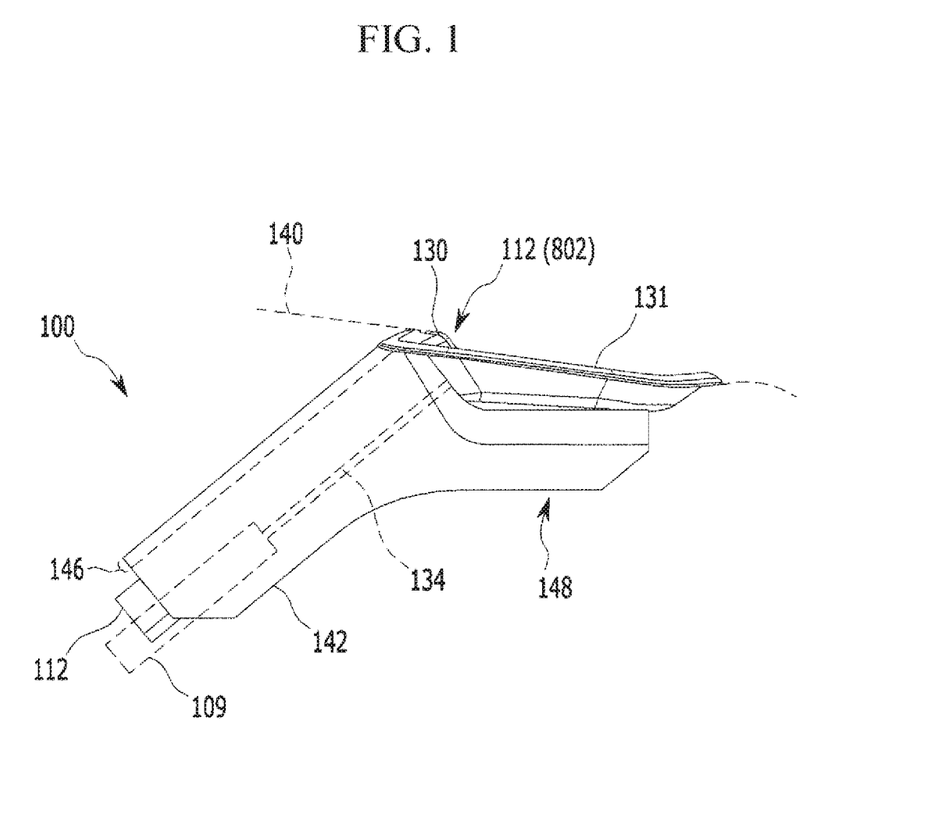
FIG. 1 is a side view of a device holder assembly according to an embodiment of the disclosure, in a dashboard of a vehicle according to embodiments, with a device holder in a stowed position.
Figure 2:
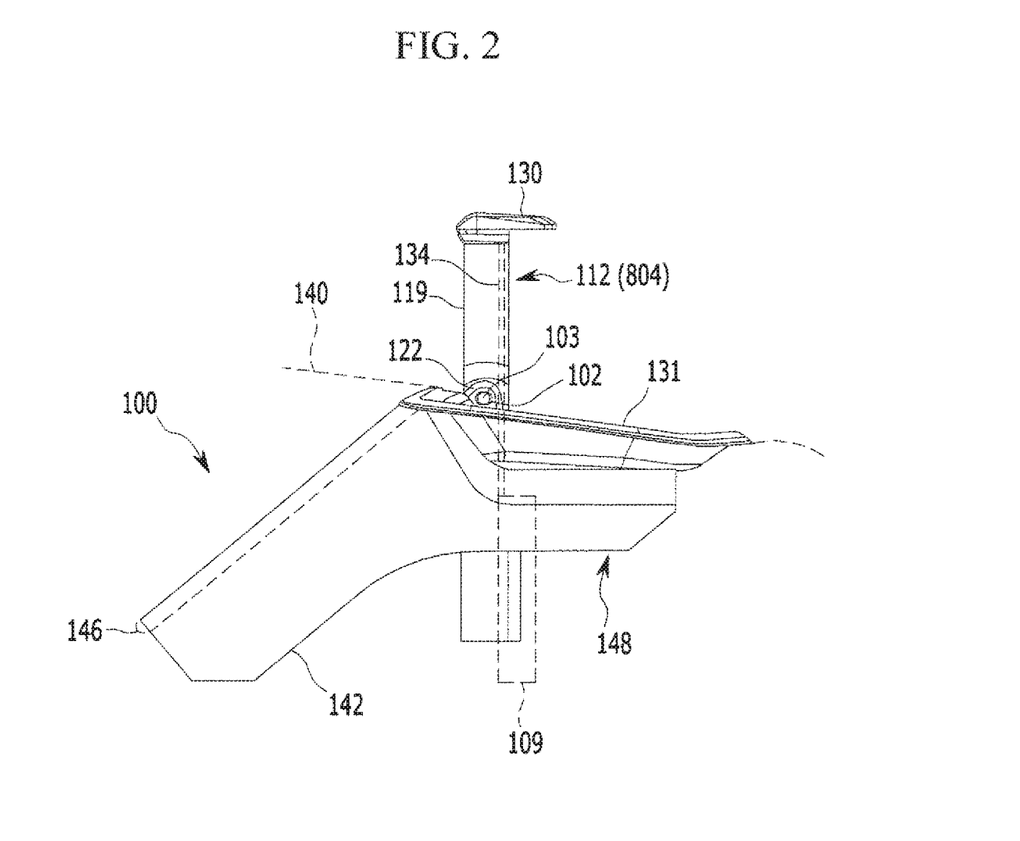
FIG. 2 is a side view of the device holder assembly of FIG. 1 with the device holder in a device holding position.
Figure 3:
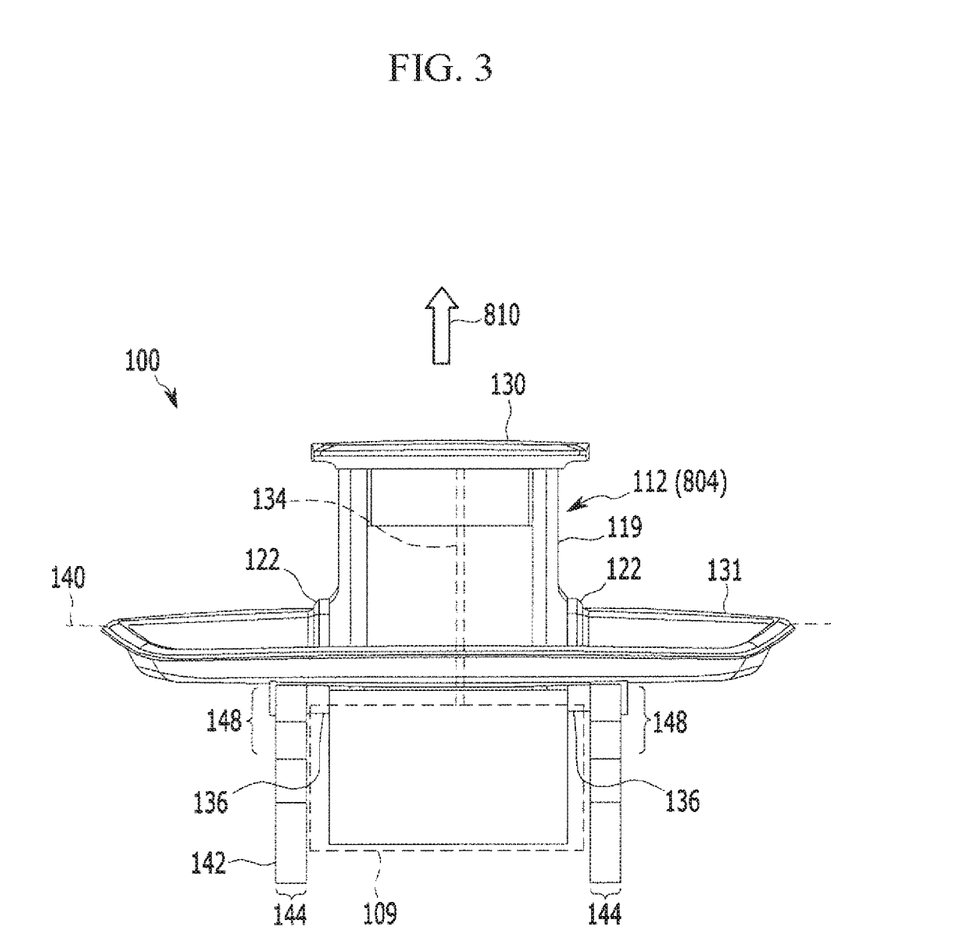
FIG. 3 is a front view of the device holder assembly of FIG. 1 in the same state as in FIG. 2.

Referring now to the presently disclosed embodiments, FIG. 1 illustrates, in a side view, a device holder assembly 100 for holding a mobile electronics device such as a smartphone inside an automobile or other vehicle (not shown). The device holder assembly 100 is mounted in a vehicle dashboard 140 of which merely a part of an outer contour is indicated, by dashed lines, in the vicinity of the device holder assembly 100. In the following, it shall be assumed that the dashboard 140 and device holder assembly 100 are oriented within the vehicle such that the front of the vehicle is located to the left of FIG. 1. Without prejudice to the orientation of mounting in the vehicle, the corresponding direction will be herein referred to as "front", and the opposite direction referred to as "rear".

In the following, the overall structure of the device holder assembly 100 shall be explained by making reference to FIGS. 1 through 7. The device holder assembly 100 comprises a base 142 including two mirror-symmetrical, boomerang-shaped side plates 144, which at the outer edge of one of the boomerang arms are connected by a flat bridge plate 146 that extends in a plane perpendicular to the drawing plane of FIG. 1, thus forming a general U-shape. At the outer edge of the other boomerang arm, where the side plates 144 form respective brackets 148 that protrude away from the bridge plate 146 at an angle of about 45°, the brackets 148 bear a tray 131. The device holder assembly 100 is installed in an opening in the dashboard 140 that corresponds in shape to the shape of the tray 131, in such a way that the edges of the tray 131 lie flush with the dashboard 140 surface while the base 142 is hidden from view in the dashboard 140 interior.

Figure 6:
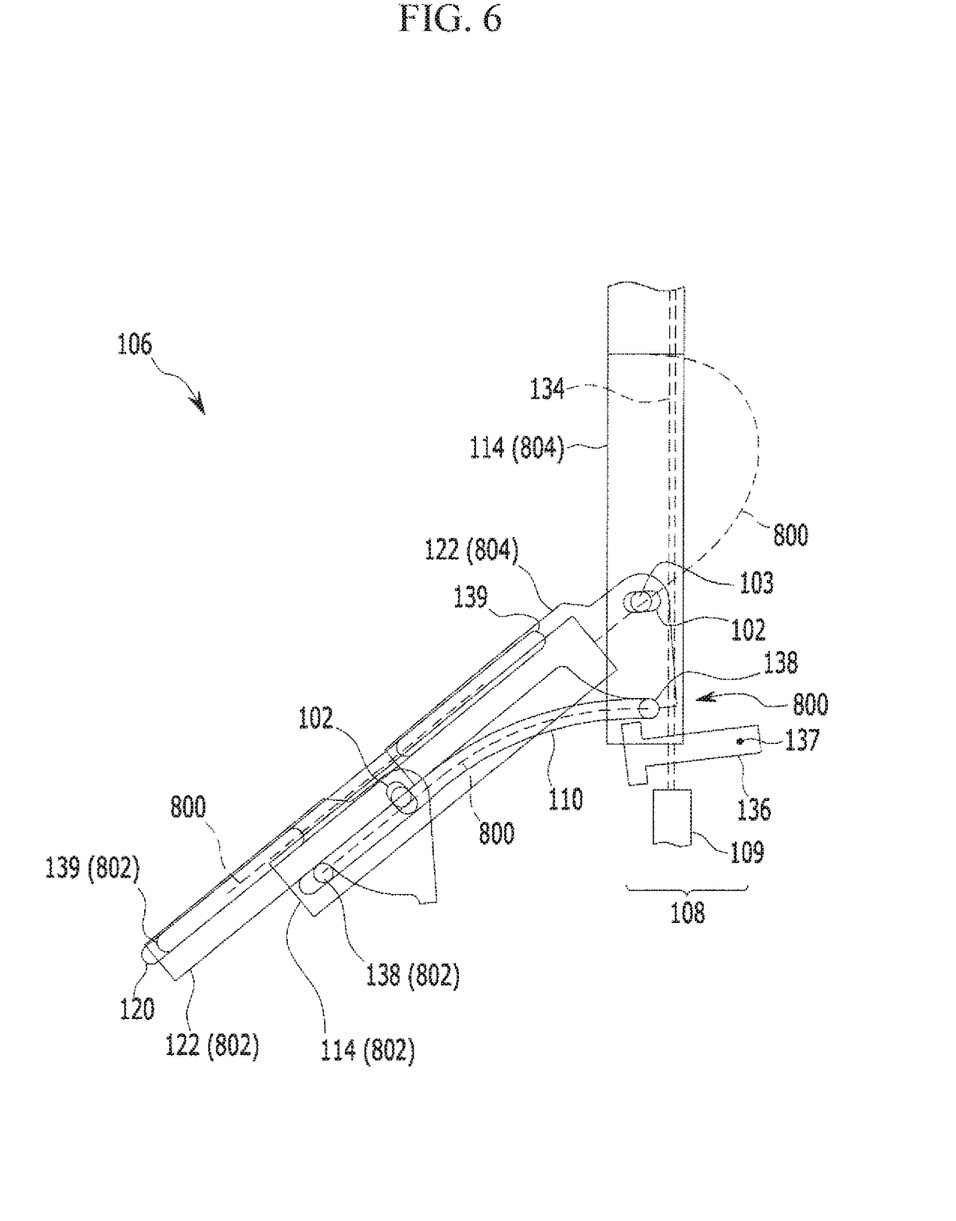
FIG. 6 is a schematic side view of a stowage mechanism of the device holder assembly of FIG. 1, for explaining a step of performing a stowage movement in a method of holding a mobile electronics device according to an embodiment.
Figure 7:
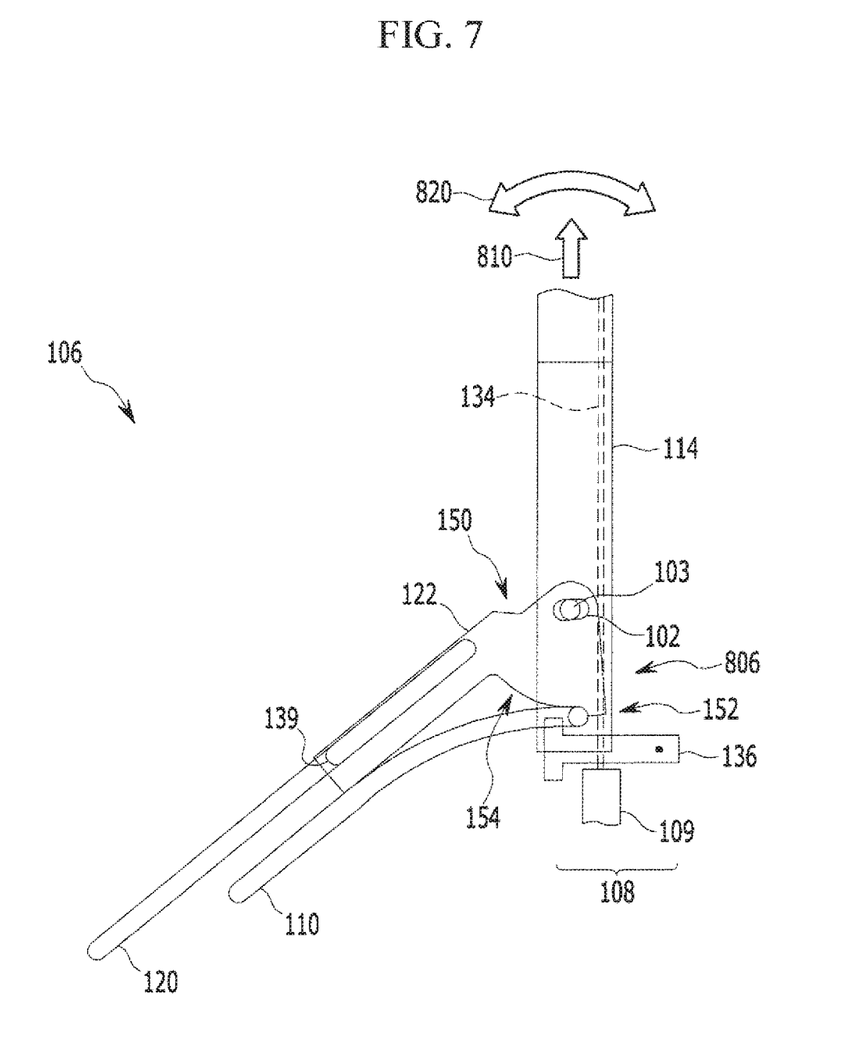
FIG. 7 is a schematic side view of the stowage mechanism of the device holder assembly of FIG. 1, for explaining further steps of the method of FIG. 6.

In each of the side plates 144, on the inner sides of the boomerang arms connected by the bridge plate 146, a first guide rail 110 and a second guide rail 120 are formed as grooves of rectangular-profile. The shape of the guide rails 110, 120 is shown in FIGS. 6 and 7 wherein the contour of the base 142 and the tray 131 have been omitted for clarity. While in each side plate 144 the first guide rail 110 extends first in a straight line from the center of the boomerang arm upwardly along the inner edge thereof to then bend in a curve toward the elbow of the boomerang shape, the second guide rail 120 extends in one straight line from the lower end to the upper end of the boomerang arm along the outer edge thereof, i.e., along the flat bridge plate 146.

Between the side plates 144, a sliding stage 122 is inserted that on each side comprises respective oblong guided elements 139 that are slidingly fitted into the second guide rails 120. The stage 122 comprises a stage bridge plate (not shown), which extends along the bridge plate 146 of the base 142 and in U-shaped fashion connects to two stage side plates, which extend along the inner sides of the side plates 144 of the base 142. The outline of the stage 122 side plates is depicted as outline of the stage 122 in FIG. 7. At the lower end, each of the stage 122 side plates is of rectangular outline shape. At the upper end, each of the stage 122 side plates comprises a fan-shaped head 150 at the top of which a horizontally extending oblong hole 102 is formed. The lower edge 154 of each fan-shaped head 150 has the form of a circular segment, which is concentric with the oblong hole 102 and ends in a stopping protrusion 152.

Between the stage 122 side plates, a generally rectangular lower frame 114 of a device holder 112 is inserted. At a lower end of two opposing edges of the lower frame 114, respective cylindrical guided elements 138 are formed, which are inserted into respective ones of the first guide rails 110 in the base 142 side plates 144. Upwardly spaced from the cylindrical guided elements 138 by a distance that corresponds to the radius of the lower edge 154 of the fan-shaped head 150 of the stage 122, there is formed a cylindrical pin 103. The lower frame 114 of the device holder 112 is inserted into the stage 122 and the base 142 in such a way that the cylindrical pins 103 are located within the oblong holes 102 of the stage 122 and the cylindrical guided elements 138 are in contact with the lower edges 154 of the respective fan-shaped heads 150.

In accordance with the stowage mechanism 106 as given by the configuration described above, the lower frame 114 of the device holder 112 is enabled to perform a stowage movement 800 between a stowed position 802 and a device holding position 804. In order to make it possible to understand the path of the stage 122 and the lower frame 114 of the device holder 112 during the stowage movement 800, FIG. 6 depicts the stage 122 and the lower frame 114 of the device holder 112 once each at the stowed position 802 and at the device holding position 804, the respective positions 802, 804 being indicated in parentheses. Furthermore, the trajectories of the oblong guided elements 139, the cylindrical guided element 138, and the upper edge of the lower frame 114 of the device holder 112 during the stowage movement are each indicated by dashed lines.

As can be seen in FIG. 6, the stowage movement 800 can be a combination of a translational and a rotational movement. In the stowed position 802 the lower frame 114 of the device holder 112 is entirely confined within the base 142. In the device holding position 804, it is vertically located outside the base 142 with the cylindrical guided element 138 located at the upper end position 806 of the first guide rail 110.

Below the upper end 806 of the first guide rail 110, anchor-shaped engagement elements 136 are pivotally 137 supported on each side plate 144 in such a way, that in a rest position as shown in FIG. 6 the engagement elements 136 do not interfere with the stowage movement 800. The engagement elements 136 may be biased by springs (not shown) to return into the rest position or configured to assume the rest position under the influence of gravity. Furthermore, the engagement elements 136 are configured to block the cylindrical guided elements 138 from leaving the upper end position 806 of the first guide rail if forced upwards from below when the device holder 112 is in the device holding position 804, as shown in FIG. 7.

Figure 4:
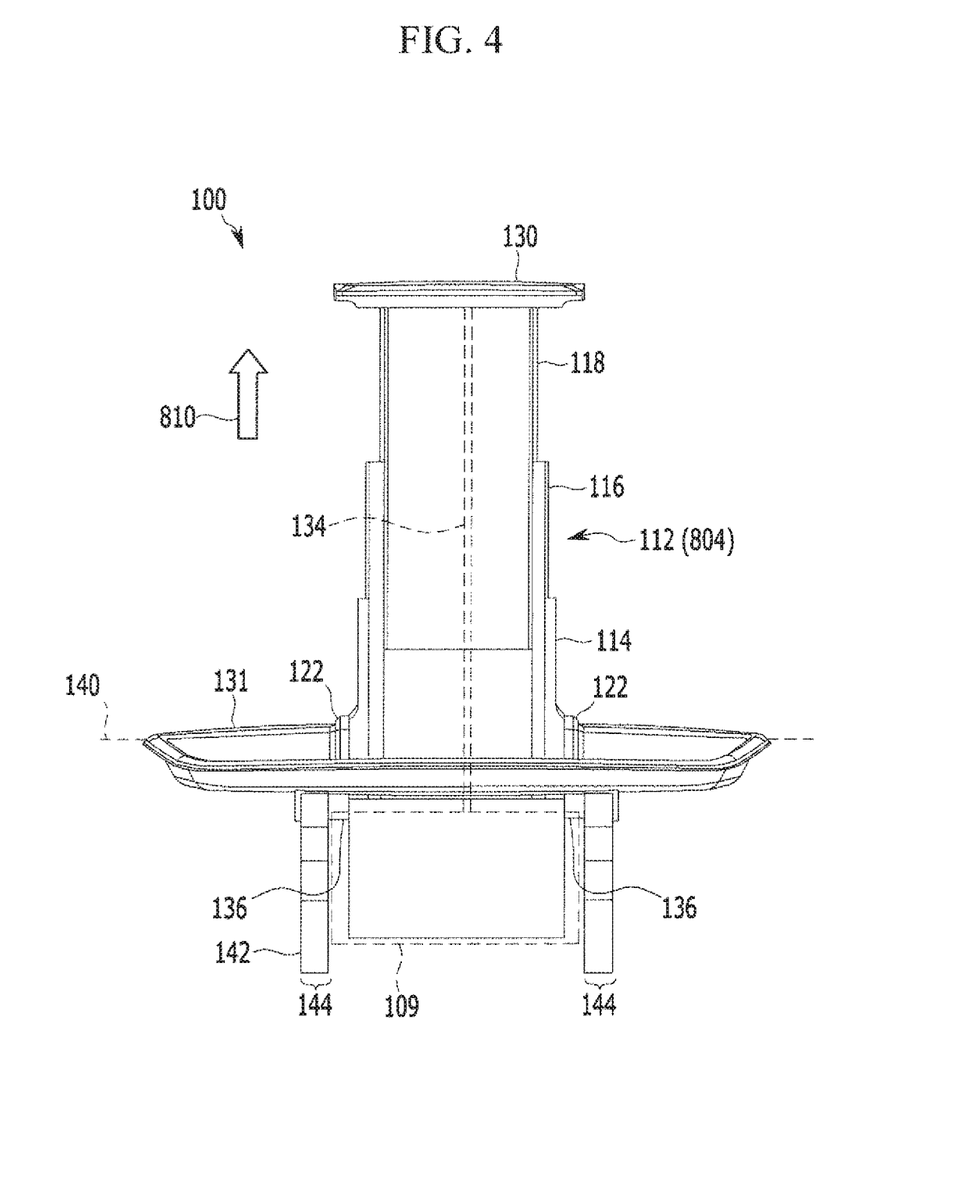
FIG. 4 is a front view of the device holder assembly of FIG. 1, the device holder being extended for receiving a mobile electronics device.
Figure 5:
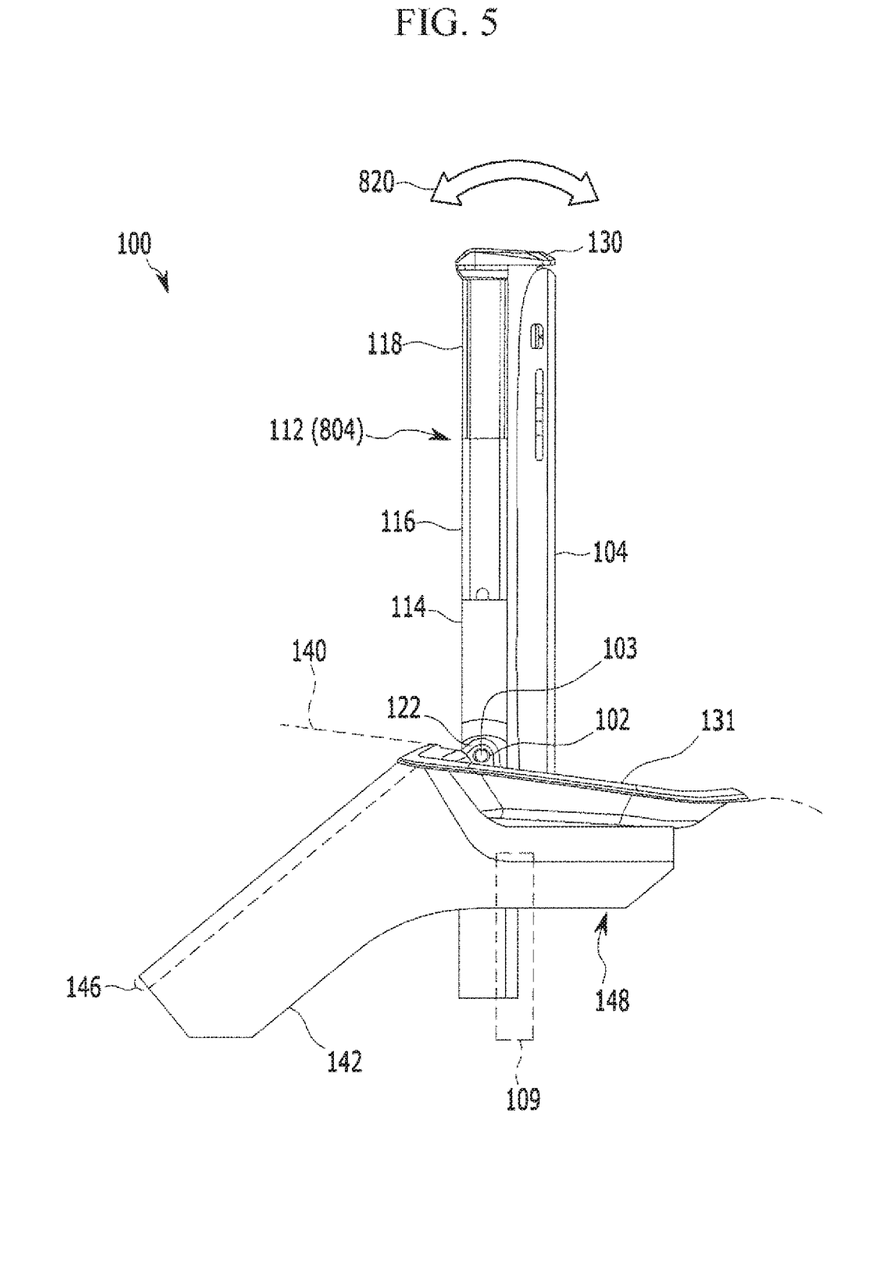
FIG. 5 is a side view of the device holder assembly of FIG. 1 with the device holder holding a mobile electronics device.

The device holder 112 comprises, in addition to the lower frame 114, a middle frame 116 and an upper frame 118, which are of a successively narrower rectangular shape and telescopically fit into each other as is shown in FIG. 4 (i.e., collapsed state) and FIG. 5 (i.e., extended state). At the top end, the device holder 112 is equipped with a first holding element 130 that in the device holding position 804 horizontally extends from the upper frame 118 rearwards, towards the side of the tray 131.

Furthermore, the device holder 112 comprises a blocking element 109 that is mounted to the rear side of the bottom end of the lower frame 114 in such a way as to be vertically slidable along the lower frame 114 when the device holder 112 is in the device holding position. The blocking element 109 is configured to engage both engagement elements 136 from below when moved upwards while the device holder 112 is in the device holding position 804. The blocking element 109 is secured to the lower frame 114 such as to be stopped, when moving downward, at a rest position shown in FIGS. 3 and 6, thereby never falling off the lower frame 114. The blocking element 109 may be biased by a spring (not shown) to return into the rest position or configured to assume the rest position under the influence of gravity.

Confined below a cladding of the device holder 112, a helical spring, rubber band or other longitudinally elastic element 134 connects the first holding element 130 of the device holder 112 to the blocking element 109. This elastic element 134 forms a part of the device holder 112 in that it pulls the first holding element 130 toward the tray 131 when, in the device holding position 804 of the device holder 112, the upper frame 118 of the device holder 112 is pulled in upward direction 810 manually. After placing a mobile electronics device 104 between the first holding element 130 and the tray 131 and manually releasing the upper frame 118 of the device holder 112, the device holder 112 is telescopically contracted under the action of the elastic element 134 until the distance between the lower surface of the first holding element 130 and the upper surface of the tray 131 corresponds to the height of the mobile electronics device 104, and the mobile electronics device 104 is held by clamping between the first holding element 130 and the tray 131, which may therefore be regarded as a second holding element.

However, the elastic element 134 also forms part of a blocking mechanism 108 that additionally includes the blocking element 109 and the engagement elements 136. As is depicted in FIGS. 6 and 7, the blocking element 109 is pulled upward 810 via the elastic element 134 as soon as the upper frame 118 of the device holder 112 is pulled upward 810 by manual action. Thereby, the blocking element 109 engages the anchor-shaped engagement elements 136 from below, which due to a step on the lower side of the engagement elements 136 serves to prevent the device holder 112 from accidentally leaving the device holding position 804. Moreover, the blocking mechanism 108 will continue to block a stowage movement 800 away from the device holding position 804, thereby mechanically supporting the mobile electronics device 104 while being held in the device holder assembly 100.

Additionally, due to a further step on the upper side of the anchor-shaped engagement elements 136, the cylindrical guided elements 138 are confined to the end positions 806 of the first guide rails 110. In cooperation with the oblong holes 102 and the cylindrical pins 103 located therein, this enables an adjustment swivel movement 820 of the device holder 112 over a limited angular range around the cylindrical guided elements 138.

While the contents of the present disclosure have been described in connection with what is presently considered to be exemplary embodiments, it is to be understood that the disclosure is not limited to the disclosed embodiments, but, on the contrary, is intended to cover various modifications and equivalent arrangements included within the spirit and scope of the appended claims.

The invention claimed is:

1. A device holder assembly for use in a vehicle, comprising:
    a device holder holding a mobile electronics device;
    a stowage mechanism performing a stowage movement to transition the device holder between a stowed position and a device holding position in a first direction; and
    a blocking mechanism which blocks the stowage movement from transitioning the device holder to the device holding position when the mobile electronics device is held by the device holder,
    wherein the stowage mechanism includes a first guide rail to guide movement of the device holder during the stowage movement, and the first guide rail extends first in a straight line in the first direction and then bends in a curve, and
    wherein the stowage mechanism further includes:
        a stage pivotably connected with the device holder; and
        a second guide rail to guide movement of the stage during the stowage movement and extending in a straight line in the first direction,
        wherein the stage has a fan-shaped head at an end thereof and the fan-shaped head has a surface in a form of a circular segment, and
        wherein a portion of the device holder guided by the first guide rail slides on the surface of the fan-shaped head such that the stowage movement further includes rotation of the device holder.

2. The device holder assembly of claim 1, wherein a connection point at which the stage is pivotably connected with the device holder includes an oblong hole.

3. The device holder assembly of claim 1, wherein the device holder includes a first holding element that is slidable in the first direction to receive the mobile electronics device.

4. The device holder assembly of claim 3, further comprising:
    an elastic element; and
    a blocking element of the blocking mechanism, wherein the elastic element extends from the first holding element to the blocking element, and
    the blocking element is configured to block the stowage movement when pulled in the first direction.

5. The device holder assembly of claim 4, wherein the blocking mechanism includes an engagement element (136), and the blocking element (109) is further configured to block the stowage movement by engaging the engagement element when pulled in the first direction.

6. The device holder assembly of claim 5, wherein the engagement element is configured to engage a guided element of the device holder to perform an adjustment swivel movement that moves the device holder around the guided element.

7. A dashboard for a vehicle, the dashboard comprising:
    a device holder assembly which includes:
        a device holder holding a mobile electronics device;
        a stowage mechanism performing a stowage movement to transition the device holder between a stowed position and a device holding position in a first direction; and
        a blocking mechanism which blocks the stowage movement from transitioning the device holder to the device holding position when the mobile electronics device is held by the device holder,
    wherein the stowage mechanism includes a first guide rail to guide movement of the device holder during the stowage movement, and the first guide rail extends first in a straight line in the first direction and then bends in a curve, and
    wherein the stowage mechanism further includes:
        a stage pivotably connected with the device holder; and
        a second guide rail to guide movement of the stage during the stowage movement and extending in a straight line in the first direction,
        wherein the stage has a fan-shaped head at an end thereof and the fan-shaped head has a surface in a form of a circular segment, and
        wherein a portion of the device holder guided by the first guide rail slides on the surface of the fan-shaped head such that the stowage movement further includes rotation of the device holder.

8. A vehicle comprising:
    a device holder assembly which includes:
        a device holder holding a mobile electronics device;
        a stowage mechanism performing a stowage movement to transition the device holder between a stowed position and a device holding position in a first direction; and
        a blocking mechanism which blocks the stowage movement from transitioning the device holder to the device holding position when the mobile electronics device is held by the device holder,
    wherein the stowage mechanism includes a first guide rail to guide movement of the device holder during the stowage movement, and the first guide rail extends first in a straight line in the first direction and then bends in a curve, and wherein the stowage mechanism further includes:
- a stage pivotably connected with the device holder; and
- a second guide rail to guide movement of the stage during the stowage movement and extending in a straight line in the first direction,
- wherein the stage has a fan-shaped head at an end thereof and the fan-shaped head has a surface in a form of a circular segment, and
- wherein a portion of the device holder guided by the first guide rail slides on the surface of the fan-shaped head such that the stowage movement further includes rotation of the device holder.

* * * * *